UNITED STATES PATENT OFFICE.

ERICK LUNDQUIST, OF GRASS VALLEY, CALIFORNIA.

IMPROVEMENT IN PROCESSES FOR SEPARATING GOLD AND SILVER FROM BASE METALS.

Specification forming part of Letters Patent No. 137,375, dated April 1, 1873; application filed September 25, 1872.

*To all whom it may concern:*

Be it known that I, ERICK LUNDQUIST, of Grass Valley, Nevada county, State of California, have invented an Improved Process for Separating Gold and Silver from Base Metals; and I do hereby declare the following description and accompanying drawing are sufficient to enable any person skilled in the art or science to which it most nearly appertains to make and use my said invention or improvement without further invention or experiment.

My invention relates to an improved process for treating base bullion for the purpose of removing the base metals with which the gold or silver, or either separately, may be combined, preparatory to separating the gold and silver when these metals are in combination.

I first place the bullion, of whatever fineness, in a reverberating furnace, and reduce it to a molten state. While in this state I add to it the ordinary quantity of nitrate of soda or saltpetre, or any other oxidizing agent, for the purpose of oxidizing the base metals in the usual way. The mass should be well stirred until the oxidation has been thoroughly accomplished.

Thus far the process does not differ from the process now in use; but, instead of allowing the oxidized mass to remain in the same furnace to be smelted, as now performed, I remove it immediately into a bath of water, either hot or cold, by which the nitrate of soda, saltpetre, or other agent, is washed out, and nothing left but the simple combination of the oxides of the base metals with the gold and silver.

The washed mass I then remove from the bath and spread upon a proper table or plate to dry. After it has become thoroughly dried I remove it to the smelting-furnace, where, by the aid of a proper degree of heat, it is smelted, when the oxides of the base metals will be found to have separated from the gold and silver in a perfectly liquid state as molten litharge, so as to be readily drawn off and leave the two metals, or either, at the bottom free.

In the ordinary process the smelting is accomplished while the nitrate of soda or saltpetre remains in the mass, thus rendering the process imperfect on account of its presence.

The nitrate of soda or saltpetre which is dissolved out by the water-bath can mostly be recovered by evaporation in the usual way.

By removing the nitre before smelting the foaming up and overflowing of the crucible or furnace, which happens in the ordinary process, is avoided.

Having thus described my invention, what I claim, and desire to secure by Letters Patent, is—

The process above described for separating the base metals from gold and silver, or either of these metals.

E. LUNDQUIST. [L. S.]

Witnesses:
   J. L. BOONE,
   C. M. RICHARDSON.